(12) United States Patent
Mori et al.

(10) Patent No.: US 7,916,456 B2
(45) Date of Patent: Mar. 29, 2011

(54) SOLID ELECTROLYTIC CAPACITOR HAVING CARBON LAYER, CONTAINING CARBON PARTICLES AND ADDITIVE, ON SOLID ELECTROLYTE LAYER, AND METHOD OF MANUFACTURING THE SAME

(75) Inventors: Hiromi Mori, Osaka (JP); Hiroyuki Matsuura, Shiga (JP); Kazuyo Saito, Osaka (JP); Masato Ozawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 381 days.

(21) Appl. No.: 12/099,255

(22) Filed: Apr. 8, 2008

(65) Prior Publication Data

US 2008/0247120 A1  Oct. 9, 2008

(30) Foreign Application Priority Data

Apr. 9, 2007 (JP) ................. 2007-101511
May 15, 2007 (JP) ................. 2007-128933

(51) Int. Cl.
*H01G 9/04* (2006.01)
*H01G 9/145* (2006.01)
*H01G 9/00* (2006.01)

(52) U.S. Cl. ........................ 361/532; 361/523
(58) Field of Classification Search .............. 361/523, 361/532
See application file for complete search history.

(56) References Cited

U.S. PATENT DOCUMENTS

| | | | |
|---|---|---|---|
| 4,605,989 A * | 8/1986 | Marse et al. | 361/502 |
| 6,088,217 A * | 7/2000 | Patel et al. | 361/509 |
| 6,343,005 B1 | 1/2002 | Tadanobu et al. | |
| 6,556,427 B2 * | 4/2003 | Ohata et al. | 361/523 |
| 7,289,313 B2 * | 10/2007 | Takeda et al. | 361/523 |
| 7,368,191 B2 * | 5/2008 | Andelman et al. | 429/12 |

FOREIGN PATENT DOCUMENTS

| | | | |
|---|---|---|---|
| JP | 02166715 A * | 6/1990 | |
| JP | 3-159222 | 7/1991 | |
| JP | 2001217159 A * | 8/2001 | |
| JP | 2001-284182 | 10/2001 | |

* cited by examiner

*Primary Examiner* — Eric Thomas
*Assistant Examiner* — David M Sinclair
(74) *Attorney, Agent, or Firm* — Wenderoth, Lind & Ponack, LLP.

(57) ABSTRACT

A carbon layer is formed on a solid electrolyte layer of the solid electrolytic capacitor, and a conductor layer connected to a cathode terminal is further disposed thereon. The carbon layer contains carbon particles, and a first additive or a second additive. The first additive is formed from at least one of those selected from the group consisting of hydrated silica and silicate. The second additive is formed from at least one of those selected from the group consisting of a condensation product of an aromatic sulfonic acid with formaldehyde, a condensation product of an aromatic sulfonate with formaldehyde, polystyrene sulfonic acid, and polystyrene sulfonate.

6 Claims, 2 Drawing Sheets

SOLID ELECTROLYTIC CAPACITOR HAVING CARBON LAYER, CONTAINING CARBON PARTICLES AND ADDITIVE, ON SOLID ELECTROLYTE LAYER, AND METHOD OF MANUFACTURING THE SAME

BACKGROUND OF THE INVENTION

1. Field of the Invention

The present invention relates to a solid electrolytic capacitor used for various electronic equipment, and a method of manufacturing the same.

2. Background Art

With the recent development of digital equipment, there is a strong demand for a capacitor that is lower in equivalent series resistance (hereinafter referred as ESR) and excellent in high frequency characteristics. In order to meet such a demand, those using a solid electrolyte layer of manganese dioxide, polypyrrole, or polythiophene as electrolyte have been developed and commercialized.

FIG. 2 is a sectional view of a conventional solid electrolytic capacitor. The solid electrolytic capacitor includes capacitor element 5, anode terminal 6, cathode terminal 8, and exterior resin 9. Capacitor element 5 is formed of anode body 1, dielectric oxide layer 2, solid electrolyte layer 3, and cathode layer 4.

Anode body 1 is formed by sintering valve metal such as aluminum and tantalum as a porous body. Anode lead-out portion 1A is disposed so as to protrude from anode body 1. Dielectric oxide layer 2 is formed on the surface of anode body 1 by using an anode oxidizing method. Solid electrolyte layer 3 contains a conductive polymer such as polypyrrole and is formed on the surface of dielectric oxide layer 2. Cathode layer 4 is formed of carbon layer 4A and conductor layer 4B made from silver paste, and formed on the surface of solid electrolyte layer 3. Anode terminal 6 is connected to anode lead-out portion 1A, and cathode terminal 8 is connected to conductor layer 4B via conductive adhesive 7. Anode terminal 6 and cathode terminal 8 respectively include connections 6A and 8A to be connected to an electronic circuit. Insulating exterior resin 9 covers capacitor element 5, anode terminal 6, and cathode terminal 8 except connections 6A and 8A.

In a solid electrolytic capacitor having a configuration as described above, solid electrolyte layer 3 is very low in specific resistance. Accordingly, the solid electrolytic capacitor is low in ESR. Such a solid electrolytic capacitor is for example disclosed in Unexamined Japanese Patent Publication No. 2001-284182.

However, in the case of the conventional solid electrolytic capacitor, when exposed in a high temperature environment, ESR tends to increase with time. The following can be considered as a main reason of such a phenomenon.

In a high temperature environment, solid electrolyte layer 3 containing a conductive polymer tends to peel itself off from carbon layer 4A formed thereon. Accordingly, the interfacial resistance increases between solid electrolyte layer 3 and carbon layer 4A. Also, external oxygen or water entering from gaps created due to peeling solid electrolyte layer 3 off from carbon layer 4A increases the specific resistance of solid electrolyte layer 3, itself. As a result, ESR of the solid electrolytic capacitor is liable to increase with the lapse of time.

SUMMARY OF THE INVENTION

The present invention is a solid electrolytic capacitor which undergoes less successive change of ESR even in a high temperature environment, and its manufacturing method. The solid electrolytic capacitor of the present invention has an anode body made of a valve metal, a dielectric oxide layer, a solid electrolyte layer, a carbon layer, a conductor layer, an anode terminal, and a cathode terminal. The dielectric oxide layer is formed on the anode body, and the solid electrolyte layer is formed on the dielectric oxide layer. The carbon layer is formed on the solid electrolyte layer, and the conductor layer is formed on the carbon layer. The anode terminal is connected to the anode body, and the cathode terminal is connected to the conductor layer. The carbon layer contains carbon particles and either a first additive or a second additive. The first additive is formed of at least one of those selected from a group consisting of hydrated silica and silicate. The second additive is formed of at least one of those selected from a group consisting of a condensation product of an aromatic sulfonic acid with formaldehyde, a condensation product of an aromatic sulfonate with formaldehyde, polystyrene sulfonic acid, and polystyrene sulfonate.

In the solid electrolytic capacitor of the present invention, the carbon layer contains the first additive or the second additive, and therefore, the adhesion of the carbon layer to the solid electrolyte layer can be maintained even in a high temperature environment. Accordingly, peeling of the carbon layer can be suppressed. As a result, it is possible to prevent the interfacial resistance from increasing between the solid electrolyte layer and the carbon layer. Also, it is possible to suppress the intrusion of external oxygen or water and to prevent increasing of the specific resistance of the solid electrolyte layer itself. Accordingly, the solid electrolytic capacitor of the present invention undergoes less successive change of ESR.

DETAILED DESCRIPTION OF THE INVENTION

First Exemplary Embodiment

Figure 1:
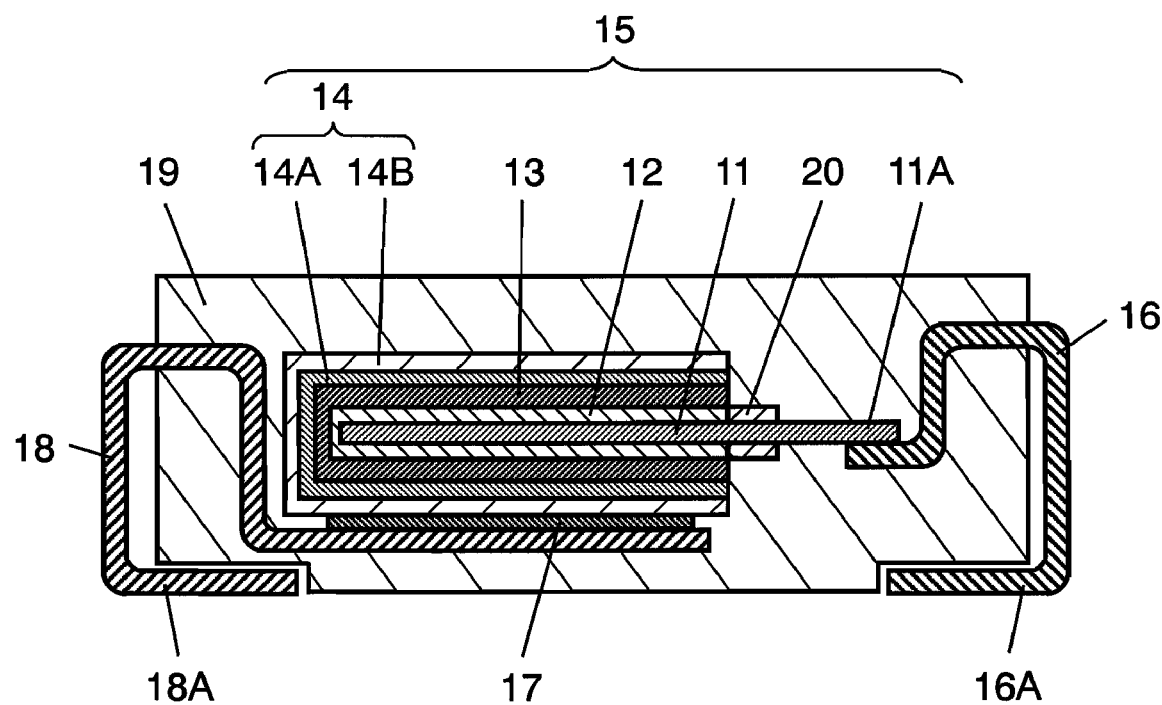
FIG. 1 is a sectional view of a solid electrolytic capacitor according to exemplary embodiments of the present invention.
Figure 2:
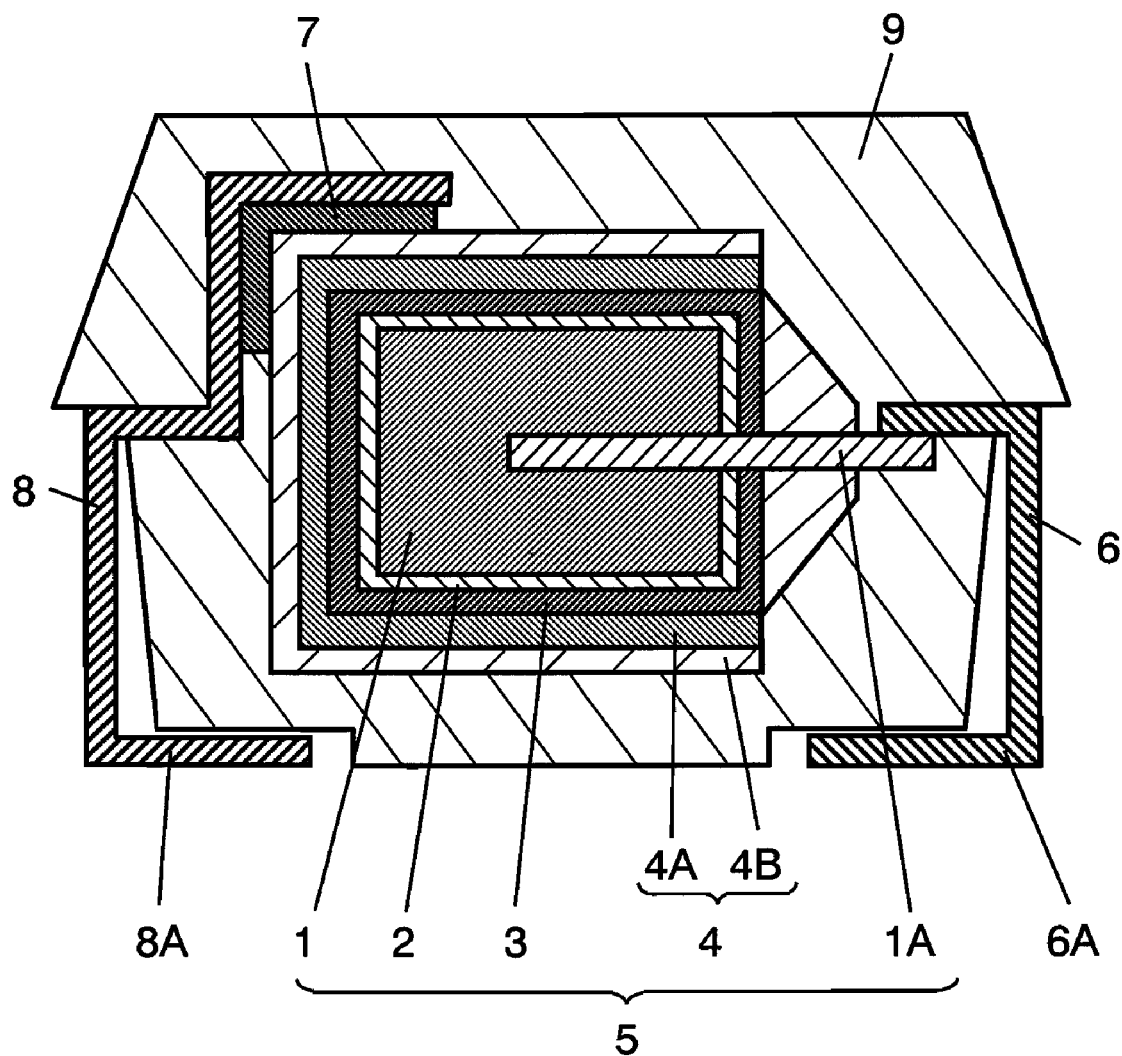
FIG. 2 is a sectional view of a conventional solid electrolytic capacitor.

FIG. 1 is a sectional view showing the configuration of an aluminum electrolytic capacitor which is an example of solid electrolytic capacitor according to a first exemplary embodiment. The solid electrolytic capacitor includes capacitor element 15, anode terminal 16, cathode terminal 18, and exterior resin 19. Capacitor element 15 is formed of anode body 11, dielectric oxide layer 12, solid electrolyte layer 13, and cathode layer 14.

Anode body 11 is formed of a foil of a valve metal such as aluminum, and its surface is roughed by etching to enlarge the surface area. Also, the end portion thereof also serves as anode lead-out portion 11A. Anode lead-out portion 11A and anode body 11 are separated from each other by insulating resist material 20 disposed so as to come into tight contact with the surface of the foil. Dielectric oxide layer 12 is formed by chemical treatment of the surface of anode body 11.

Solid electrolyte layer 13 is formed on dielectric oxide layer 12. Solid electrolyte layer 13 is formed of a pre-coat layer such as a manganese dioxide layer and a conductive polymer layer such as polypyrrole, polythiophene, and polyaniline.

Cathode layer 14 is formed on solid electrolyte layer 13 and serves as a cathode lead-out portion. Cathode layer 14 is formed of carbon layer 14A sequentially formed on solid electrolyte layer 13 and conductor layer 14B containing conductive particles such as silver and nickel. Carbon layer 14A contains carbon particles and a first additive formed of at least one of those selected from the group consisting of hydrated silica and silicate. As such silicate, for example, water glass ($Na_2O.nSiO_2$), sodium silicate, potassium silicate, and magnesium aluminum silicate can be mentioned.

Anode terminal 16 is connected to anode lead-out portion 11A of capacitor element 15 having such a configuration. On the other hand, cathode terminal 18 is connected to conductor layer 14B in cathode layer 14. Anode terminal 16 and cathode terminal 18 respectively include connections 16A and 18A which are to be connected to an electronic circuit. Insulating exterior resin 19 such as epoxy resin covers capacitor element 15, anode terminal 16, and cathode terminal 18 except connections 16A and 18A.

The method of manufacturing an aluminum electrolytic capacitor having such a structure will be described in the following. First, a foil of a valve metal such as aluminum enlarged in surface area by etching is cut off into specific width and length to prepare anode body 11. Then, insulating tape-like resist material 20 is affixed to the surface of anode body 11. In this way, anode body 11 and anode lead-out portion 11A disposed on the end portion thereof are separated from each other.

Subsequently, anode body 11 is immersed in a solution such as ammonium dihydrogen phosphate aqueous solution, followed by applying a DC voltage to perform chemical treatment. In this way, dielectric oxide layer 12 is formed on the surface of anode body 11.

After that, anode body 11 formed with dielectric oxide layer 12 is immersed in a manganese nitrate aqueous solution and then taken out to remove excessive manganese nitrate solution sticking to the surface thereof. Subsequently, it is heated at about 300° C. to perform thermal decomposition, thereby forming a pre-coat layer of solid electrolyte layer 13 described later on dielectric oxide layer 12. The pre-coat layer is made of manganese dioxide. Next, a conductive polymer layer made of polypyrrole or the like is formed on the pre-coat layer by using an electrolytic polymerization method. Solid electrolyte layer 13 is formed as described above.

On the other hand, submicron carbon particles are dispersed in water by 2 to 10 wt %. At least one compound (the first additive) selected from hydrated silica and/or silicate mentioned above is mixed in the dispersion liquid to be muddy. The carbon-containing liquid thus prepared is applied to the surface of solid electrolyte layer 13. After that, solvent component is removed at a high temperature ranging from 130° C. to 215° C. to form carbon layer 14A. For applying the carbon-containing liquid to the surface of solid electrolyte layer 13, anode body 11 formed with solid electrolyte layer 13 is immersed in the carbon-containing liquid. Or, a member such as a roller or a sponge holding the carbon-containing liquid is abutted to anode body 11 formed with solid electrolyte layer 13.

On the other hand, conductive particles such as silver or nickel are dispersed in epoxy resin or the like to prepare a conductive paste. And, the conductive paste is applied to the surface of carbon layer 14A and it is hardened to form conductor layer 14B. In this way, cathode layer 14 consist of carbon layer 14A and conductor layer 14B is formed. Capacitor element 15 is manufactured according to the above procedure.

After that, one end of anode terminal 16 is connected to anode lead-out portion 11A. Also, one end of cathode terminal 18 is connected to the surface of conductor layer 14B via conductive adhesive 17.

Next, connections 16A, 18A are formed by finishing each of anode terminal 16 and cathode terminal 18 in such a manner that the each end not connected to capacitor element 15 is able to come into contact with the electronic circuit board. The whole of capacitor element 15 is covered with exterior resin 19 in such a manner as to expose connections 16A, 18A. In this way, the solid electrolytic capacitor is manufactured.

Note here that it is also possible to form anode body 11 by using a porous sintered body formed from a powder of a valve metal such as aluminum, tantalum, or titanium other than the foil of a valve metal. In that case, anode lead-out portion 11A is formed by burying a lead wire made of the valve metal in the porous sintered body of anode body 11 in such a manner that the wire is partially exposed.

Also, the conductive polymer of solid electrolyte layer 13 is not limited to polypyrrole. As heterocyclic monomer, besides pyrrole, it is possible to use polymerizable monomer selected from at least one of thiophene, aniline, furan or derivatives of these, for example, 3,4-ethylene dioxythiophene. Solid electrolyte layer 13 can be formed by electrolytic polymerization or chemical oxidative polymerization of them.

In the electrolytic polymerization method, anode body 11 formed with a pre-coat layer or the like is externally supplied with electric power in a solution containing the polymerizable monomer and a dopant, thereby forming the conductive polymer layer of solid electrolyte layer 13. Also, in the chemical oxidative polymerization method, anode body 11 formed with the pre-coat layer or the like is immersed in a solution containing the polymerizable monomer, and thereafter immersed in a mixed solution of a dopant and an oxidizing agent or a solution containing the compound of a dopant and an oxidizing agent. In this way, the conductive polymer layer of solid electrolyte layer 13 is formed.

As the dopant, aromatic compound having at least one of carboxyl group and sulfonic acid group is used. Aromatic compound having carboxyl group used for the dopant can be selected from the compound of benzoic acid, phthalic acid, sulfo-phthalic acid, and hydroxy-benzoic acid, or the derivative thereof, or the sodium salt, potassium salt, and ammonium salt thereof. Also, aromatic compound having sulfonic acid group used for the dopant can be selected from benzenesulfonic acid, p-toluenesulfonic acid, naphthalenesulfonic acid, butyl naphthalenesulfonic acid, phenol sulfonic acid, sulfosalicylic acid, sulfo-benzoic acid, naphthalene disulfonic acid, benzene disulfonic acid, and anthraquinone disulfonic acid, or the derivative thereof, or sodium salt, potassium salt, and ammonium salt thereof.

As the oxidizing agent, for example, iron (II) salt, peroxosulfate, permanganate, or hydrogen peroxide can be used, and as iron (II) salt, ferric sulfate or iron salt of the dopant such as p-toluene sulfonic acid, butyl naphthalene sulfonic acid, and anthraquinone sulfonic acid can be used.

As other conductive polymer, it is possible to use solubilized conductive polymer such as polyaniline having imino-p-phenylene structure to form the conductive polymer.

Also, instead of the manganese dioxide layer formed as the pre-coat layer of solid electrolyte layer 13, it is possible to form the pre-coat layer by using other conductive material such as conductive polymer.

Further, the carbon particles contained in carbon layer 14A are selected from any one of graphite, carbon black, and plumbago. Also, it is possible to use a carbon paste in the process of forming carbon layer 14A. In that case, the carbon paste is prepared by mixing an organic solvent with an organic binder, carbon particles, hydrated silica and/or silicate. Butyl acetate, alcohol, ketone, and the like can be used as the organic solvent. Acrylic resin, polyester resin, epoxy resin, urethane resin, vinyl acetate resin, and the like can be used as the organic binder. The content of carbon particles in the carbon paste is to be 20 to 90 wt %. It is possible to apply such a carbon paste to anode body 11 formed with solid electrolyte layer 13 and other layers, and to harden it at a high temperature in order to form carbon layer 14A.

Also, carbon layer 14A may contain aromatic compound represented by general formula (1) in addition to the carbon particles and the first additive formed of hydrated silica and/or silicate. In that case, in the process of forming carbon layer 14A, when a carbon-containing liquid is used, after dispersing carbon in water, it is possible to use the carbon-containing liquid prepared by mixing hydrated silica and/or silicate and aromatic compound represented by general formula (1). It is possible to use a surface active agent in order to dissolve the aromatic compound represented by general formula (1). It is also possible to add monovalent alcohol such as methanol, ethanol, and isopropanol.

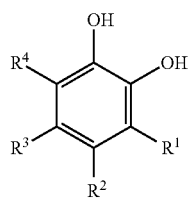

(1)

$R^1$ to $R^4$ are hydrogen atom, hydroxyl group, carboxyl group, or alkyl group.

For adjusting the electrostatic capacity, it is possible to laminate a plurality of capacitor elements 15 and to connect them in parallel fashion. In the case of capacitor element 16 using an aluminum foil as anode body 11, cathode layers 14 of capacitor elements 15 laminated and contacted are connected to each other. And, it is possible to connect anode lead-out portions 11A together making them up into a bundle.

In the present exemplary embodiment, carbon layer 14A contains the carbon particles and the first additive formed of hydrated silica and/or silicate. In this configuration, the adhesion of carbon layer 14A to solid electrolyte layer 13 can be maintained even in a high temperature environment. Accordingly, it is possible to suppress the peeling of carbon layer 14A. As a result, it is possible to prevent the interface resistance from increasing between solid electrolyte layer 13 and carbon layer 14A. Also, the increase in specific resistance of solid electrolyte layer 13, itself, can be prevented by suppressing intrusion of external oxygen or water. Accordingly, it is possible to manufacture a solid electrolytic capacitor that undergoes less successive change of ESR.

The ratio of hydrated silica and/or silicate contained in carbon layer 14A preferably in a range from 0.06 to 0.9 inclusive referred to carbon particle as 1 in weight. As a result, in a high temperature environment, the action of maintaining the adhesion of carbon layer 14A to solid electrolyte layer 13 is enhanced.

When the ratio of hydrated silica and/or silicate is less than 0.06 referred to carbon particle as 1 in weight, the action of maintaining the adhesion of carbon layer 14A to solid electrolyte layer 13 is not sufficient in a high temperature environment. On the other hand, in a range of exceeding 0.9, the specific resistance of carbon layer 14A increases and results in increase of ESR.

Also, as a method of forming carbon layer 14A containing the carbon particles, hydrated silica and/or silicate on solid electrolyte layer 13, it is preferable to employ a method of applying and drying the carbon-containing liquid as described above on solid electrolyte layer 13. The carbon-containing liquid is a turbid liquid prepared by mixing carbon particles, hydrated silica and/or silicate together. Since the carbon particles are dispersed in the turbid liquid at a high degree, carbon layer 14A being dense and uniform in quality can be formed on the surface of solid electrolyte layer 13. As a result, it is possible to enhance the adhesion of carbon layer 14A to solid electrolyte layer 13.

When ammonia or the like is added to the turbid liquid to make it alkaline (pH 8 to 11), the dispersibility of the carbon particles in the turbid liquid can be further improved. Also, it is possible to improve the dispersibility of the carbon particles by making the content of the carbon particles in the turbid liquid ranging from 2 wt % to 10 wt % inclusive.

Further, magnesium aluminum silicate which is one of silicates is easy to suspend into colloid and serves to further enhance the dispersibility of the carbon particles in the turbid liquid. Accordingly, it is possible to make carbon layer 14A dense and uniform in quality which is applied, dried and formed on the surface of solid electrolyte layer 13 and to enhance the adhesion of carbon layer 14A to solid electrolyte layer 13.

Also, carbon layer 14A preferably contains aromatic compound represented by general formula (1) in addition to carbon particles, hydrated silica and/or silicate. In this configuration, the adhesion of carbon layer 14A to solid electrolyte layer 13 in a high temperature environment can be further maintained. As a result, it is possible to manufacture a solid electrolytic capacitor that undergoes even less successive change of ESR.

Also, it is preferable to make the ratio of hydrated silica and/or silicate contained in carbon layer 14A ranging from 0.06 to 0.9 inclusive referred to carbon particle as 1 in weight, and to limit the ratio of aromatic compound represented by general formula (1) in weight. That is, it is preferable to make the ratio ranging from 0.1 to 1.8 inclusive referred to carbon particle as 1 in weight. When the content of aromatic compound represented by general formula (1) is less than 0.1, with respect to the maintenance of adhesion of carbon layer 14A to solid electrolyte layer 13 in a high temperature environment, synergistic effect in connection with hydrated silica and/or silicate cannot be sufficiently obtained. On the other hand, in a range of exceeding 1.8, the specific resistance of carbon layer 14A becomes increased, resulting in increase of ESR.

Further, the following method is preferable as a method of forming carbon layer 14A containing the carbon particles, hydrated silica and/or silicate and the aromatic compound represented by general formula (1). That is, a turbid liquid of the carbon particles, hydrated silica and/or silicate and the aromatic compound represented by general formula (1) is applied to the surface of solid electrolyte layer 13 of anode body 11 and dried thereafter. In this method, the carbon particles are dispersed in the turbid liquid at a high degree. Accordingly, carbon layer 14A being dense and uniform in quality can be formed on the surface of solid electrolyte layer 13, and it is possible to enhance the adhesion of carbon layer 14A to solid electrolyte layer 13.

Also, it is preferable to use catechol, pyrogallol or its mixture as the aromatic compound represented by general formula (1) contained in carbon layer 14A. These show great action of maintaining the adhesion of carbon layer 14A to solid electrolyte layer 13 in a high temperature environment.

A specific example in the present exemplary embodiment will be described in the following. That is, magnesium aluminum silicate is used as the first additive, and pyrogallol is used as aromatic compound represented by general formula (1).

An aluminum foil enlarged about 125 times larger in surface area by etching is used as anode body 11. And insulating resist material 20 is affixed to the front and back of anode body 11 to separate anode body 11 from anode lead-out portion 11A. In this way, the effective region except anode lead-out portion 11A of anode body 11 is prepared making it 3.2 mm×3.9 mm.

Next, anode body 11 is immersed into ammonium dihydrogen phosphate aqueous solution of 0.3 wt % in concentration at the solution temperature 70° C., and supplied with DC voltage 12V for 20 minutes. In this way, dielectric oxide layer 12 is formed on the surface of anode body 11.

Subsequently, anode body 11 formed with dielectric oxide layer 12 is immersed in 20 wt % manganese nitrate aqueous solution at 25° C. for three seconds and then taken out. After that, excess manganese nitrate aqueous solution sticking to the surface is removed by air blow. Subsequently, it is heated up to 250° C. within one minute and manganese nitrate is discomposed at 300° C. for five minutes, thereby forming a manganese dioxide layer on the surface of dielectric oxide layer 12. The manganese dioxide layer serves as the pre-coat layer of solid electrolyte layer 13.

After that, solid electrolyte layer 13 of conductive polymer made of a polypyrrole film is formed on the surface of the manganese dioxide layer formed on anode body 11 by using an electrolytic polymerization method. That is, pyrrole monomer of 0.5 mol/L, which is a heterocyclic monomer, as polymerized monomer and sulfo-salicylic acid of 0.1 mol/L as the dopant are mixed in an organic solvent. Thus, a solution containing pyrrole monomer and sulfo-salicylic acid is prepared. In this solution, a positive electrode for polymerization is brought closer to the surface of manganese dioxide layer of anode body 11, and a voltage is applied so that a potential difference of 3V is generated between it and a negative electrode for polymerization disposed opposite to the positive electrode for polymerization. In this way, electrolytic polymerization is performed to form a conductive polymer layer. Solid electrolyte layer 13 is thus formed.

Next, 2 wt % of carbon particles and 0.12 wt % of magnesium aluminum silicate are mixed and dispersed in water, and ammonia is added thereto to prepare a carbon-containing liquid of pH10. After immersing anode body 11 formed with solid electrolyte layer 13 into the mixed muddy carbon-containing liquid, it is taken out and dried at 150° C. to remove the solvent. In this way, carbon layer 14A is formed. In this case, magnesium aluminum silicate is contained in carbon layer 14A at a ratio of 0.06 referred to the carbon particles as 1 in weight, and is uniformly dispersed in carbon layer 14A.

Subsequently, a conductive paste made of silver filler and epoxy binder resin is applied to the surface of carbon layer 14A. After that, it is hardened at 150 to 200° C. for 10 to 60 minutes to form conductor layer 14B. In this way, capacitor element 15 is manufactured.

Next, anode terminal 16 is welded to anode lead-out portion 11A. On the other hand, cathode terminal 18 is connected to conductor layer 14B by using conductive adhesive 17. And, the whole of capacitor element 15 is covered with insulating exterior resin 19 in such a manner that connections 16A, 18A of anode terminal 16 and cathode terminal 18 respectively to be connected to the electronic circuits are exposed. In this way, a solid electrolytic capacitor of sample AA is manufactured. The size of the solid electrolytic capacitor is 7.3×4.3×2.8 mm, and the rated values are 6.3 WV, 22 μF.

When manufacturing a solid electrolytic capacitor of sample AB, the composition of carbon-containing liquid for forming carbon layer 14A is changed. That is, 10 wt % of a carbon particles and 0.6 wt % of magnesium aluminum silicate are mixed and dispersed in water, and ammonia is added thereto to make the carbon-containing liquid of pH10 for forming carbon layer 14A. The solid electrolytic capacitor of sample AB is manufactured as same as that of sample AA except for this.

When manufacturing a solid electrolyte capacitor of sample AC, the composition of a carbon-containing liquid for forming carbon layer 14A is further changed. That is, 5 wt % of carbon particles and 0.3 wt % of magnesium aluminum silicate are mixed and dispersed in water, and ammonia is added thereto to make the carbon-containing liquid of pH10 for forming carbon layer 14A. The solid electrolytic capacitor of sample AC is manufactured as same as that of sample AA except for this.

Note here that in carbon layer 14A formed in samples AB, AC, the same as in sample AA, magnesium aluminum silicate is contained at a ratio of 0.06 referred to the carbon particles as 1 in weight, which is uniformly dispersed in carbon layer 14A.

When manufacturing a solid electrolytic capacitor of sample AD, the composition of a carbon-containing liquid for forming carbon layer 14A is further changed. That is, 5 wt % of carbon particles and 2.5 wt % of magnesium aluminum silicate are mixed and dispersed in water, and ammonia is added thereto to make a carbon-containing liquid of pH10 for forming carbon layer 14A. The solid electrolytic capacitor of sample AD is manufactured as same as that of sample AA except for this. In this case, in carbon layer 14A, magnesium aluminum silicate is contained at a ratio of 0.5 referred to the carbon particles as 1 in weight, which is uniformly dispersed in carbon layer 14A.

When manufacturing a solid electrolytic capacitor of sample AE, the composition of a carbon-containing liquid for forming carbon layer 14A is further changed. That is, 5 wt % of carbon particles and 4.5 wt % of magnesium aluminum silicate are mixed and dispersed in water, and ammonia is added thereto to make a carbon-containing liquid of pH10 for forming carbon layer 14A. The solid electrolytic capacitor of sample AE is manufactured as same as that of sample AA except for this. In this case, in carbon layer 14A, magnesium aluminum silicate is contained at a ratio of 0.9 referred to the carbon particles as 1 in weight, which is uniformly dispersed in carbon layer 14A.

When manufacturing a solid electrolytic capacitor of sample AF, the composition of a carbon-containing liquid for forming carbon layer 14A is further changed. That is, 5 wt % of carbon particles, 0.3 wt % of magnesium aluminum silicate and 0.5 wt % of pyrogallol are mixed in water and dispersed, and ammonia is added thereto to make a carbon-containing liquid of pH10 for forming carbon layer 14A. The solid electrolytic capacitor of sample AF is manufactured as same as that of sample AA except for this. In this case, in carbon layer 14A, magnesium aluminum silicate and pyrogallol are contained respectively at ratios of 0.06 and 0.1 referred to the carbon particles as 1 in weight, which are uniformly dispersed in carbon layer 14A.

When manufacturing a solid electrolytic capacitor of sample AG, the composition of a carbon-containing liquid for forming carbon layer 14A is further changed. That is, 5 wt % of carbon particles, 0.3 wt % of magnesium aluminum silicate and 5 wt % of pyrogallol are mixed and dispersed in water, and ammonia is added thereto to make a carbon-containing liquid of pH10 for forming carbon layer 14A. The solid electrolytic capacitor of sample AG is manufactured as same as that of sample AA except for this. In this case, in carbon layer 14A, magnesium aluminum silicate and pyrogallol are contained respectively at ratios of 0.06 and 1 referred to the carbon particles as 1 in weight, which are uniformly dispersed in carbon layer 14A.

When manufacturing a solid electrolytic capacitor of sample AH, the composition of a carbon-containing liquid for forming carbon layer 14A is further changed. That is, 5 wt % of carbon particles, 0.3 wt % of magnesium aluminum silicate, and 9 wt % of pyrogallol are mixed and dispersed in water, and ammonia is added thereto to make a carbon-containing liquid of pH10 for forming carbon layer 14A. The solid electrolytic capacitor of sample AH is manufactured as same as that of sample AA except for this. In this case, in carbon layer 14A, magnesium aluminum silicate and pyrogallol are contained respectively at ratios of 0.06 and 1.8 referred to the carbon particles as 1 in weight, which are uniformly dispersed in carbon layer 14A.

When manufacturing a solid electrolytic capacitor of sample BA, the composition of a carbon-containing liquid for forming carbon layer 14A is further changed. That is, 5 wt % of carbon particles and 0.5 wt % of pyrogallol are mixed and dispersed in water, and ammonia is added thereto to make a carbon-containing liquid of pH10 for forming carbon layer 14A. The solid electrolytic capacitor of sample BA is manufactured as same as that of sample AA except for this. In this case, in carbon layer 14A, pyrogallol is contained at a ratio of 0.1 referred to the carbon particles as 1 in weight, which is uniformly dispersed in carbon layer 14A.

When manufacturing a solid electrolytic capacitor of sample BB, the composition of a carbon-containing liquid for forming carbon layer 14A is further changed. That is, 5 wt % of carbon particles are suspended in water, and ammonia is added thereto to make a carbon-containing liquid of pH10 for forming carbon layer 14A. The solid electrolytic capacitor of sample BB is manufactured as same as that of sample AA except for this. In this case, carbon layer 14A contains neither magnesium aluminum silicate nor pyrogallol.

The solid electrolytic capacitors of samples AA through AH and samples BA, BB thus manufactured are evaluated with respect to electrostatic capacity C and ESR. In that case, before and after leaving at 105° C. for 1,000 hours, electrostatic capacity C and ESR are measured in order to calculate the rate of change in capacity (ΔC) and the rate of change in ESR (ΔESR) before and after leaving. The specifications of each sample and the evaluation results are shown in Table 1.

The measurements are performed at 25 to 30° C., and the electrostatic capacity and ESR are measured 120 Hz and 100 kHz, respectively. Table 1 shows the average of 30 specimens.

TABLE 1

| | Content ratio in carbon layer and content in turbid liquid (wt %) | | | Initial | | After leaving | |
|---|---|---|---|---|---|---|---|
| Samples | Carbon | MGS | P | C (μF) | ESR (mΩ) | ΔC (%) | ΔECR (%) |
| AA | 1(2) | 0.06(0.12) | — | 23 | 27 | −1.6 | 5.6 |
| AB | 1(10) | 0.06(0.6) | — | 24 | 26 | −1.8 | 5.7 |
| AC | 1(5) | 0.06(0.3) | — | 24 | 25 | −1.4 | 5.5 |
| AD | 1(5) | 0.5(2.5) | — | 24 | 25 | −1.6 | 5.5 |
| AE | 1(5) | 0.9(4.5) | — | 23 | 26 | −1.5 | 5.6 |
| AF | 1(5) | 0.06(0.3) | 0.1(0.5) | 25 | 22 | −1.2 | 3.6 |
| AG | 1(5) | 0.06(0.3) | 1(5) | 26 | 22 | −1.1 | 3.5 |
| AH | 1(5) | 0.06(0.3) | 1.8(9) | 25 | 23 | −1.3 | 3.6 |
| BA | 1(5) | — | 0.1(0.5) | 22 | 28 | −1.5 | 5.5 |
| BB | 1(5) | — | — | 21 | 32 | −5.1 | 21 |

Parenthesized value is content in turbid liquid (wt %).
MGS: magnesium aluminum silicate,
P: pyrogallol In the solid electrolytic capacitors of samples AA through AE, carbon layers 14A contain the carbon particles and magnesium aluminum silicate. As is obvious in Table 1, these samples are more excellent in initial characteristics of electrostatic capacity C and ESR as compared with sample BB containing neither magnesium aluminum silicate nor pyrogallol. Further, they are less in ΔC and ΔESR when left at 105° C. for 1,000 hours.

Also, in the solid electrolytic capacitors of samples AC through AE, the content ratio of magnesium aluminum silicate with respect to the carbon particle is different in carbon layer 14A. The content ratios are in a range from 0.06 to 0.9 inclusive. Each of the samples is more excellent in initial characteristics as compared with sample BB, and the changes are less even in a high temperature environment, thereby the content ratio of magnesium aluminum silicate to carbon particle is preferably kept in this range.

In the solid electrolytic capacitor of sample BA, carbon layer 14A contains the carbon particles and pyrogallol. From the results shown in Table 1, the initial characteristics are improved in this configuration as compared with sample BB, and it is clear that the change in the characteristics after leaving at high temperature is less.

On the other hand, in the solid electrolytic capacitors of samples AF through AH, carbon layers 14A contain pyrogallol in addition to the carbon particles and magnesium aluminum silicate. Thus, using magnesium aluminum silicate together with pyrogallol, carbon layer 14A becomes denser and more uniform in quality. Accordingly, the adhesion of the carbon layer to the solid electrolyte layer is enhanced due to the synergistic effect. As a result, the initial characteristics are further improved as compared with the case of individually combining magnesium aluminum silicate and pyrogallol with the carbon particles. Also, the change in the characteristics after leaving at high temperature is suppressed.

Also, in the solid electrolytic capacitors of samples AF through AH, the content ratios of pyrogallol to the carbon particle are different in carbon layers 14A. The content ratios are in a range from 0.1 to 1.8 inclusive. As each of the samples is more excellent in the initial characteristics as compared with sample BB, and the changes are less even in a high temperature environment, the content ratio of pyrogallol to the carbon particle is preferably kept in this range.

In the above examples, magnesium aluminum silicate is used as the first additive, and pyrogallol is used as the aromatic compound represented by general formula (1) in the description. However, the present invention is not limited to this combination. Similar effects can be obtained by using hydrated silica, water glass, sodium silicate, potassium silicate or a mixture of these as the first additive, or by using other compound such as catechol as the aromatic compound represented by general formula (1).

Second Exemplary Embodiment

In a solid electrolytic capacitor of the present exemplary embodiment, carbon layer 14A includes a second additive instead of the first additive in the first exemplary embodiment. The second additive is formed from at least one of those selected from the group consisting of a condensation product of an aromatic sulfonic acid with formaldehyde, a condensation product of an aromatic sulfonate with formaldehyde, polystyrene sulfonic acid, and polystyrene sulfonate. The other configuration is same as in the first exemplary embodiment described by using FIG. 1, and only the difference will be described in the following.

As specific examples of the second additive, the condensation product of aryl phenol sulfonic acid with formaldehyde (aryl phenosulfonic acid formaldehyde condensate), the condensation product of phenol sulfonic acid with formaldehyde (phenosulfonic acid formaldehyde condensate), the condensation product of anthraquinone sulfonic acid with formaldehyde, the condensation product of naphthalene sulfonic acid with formaldehyde, the condensation product of polystyrene sulfonic acid, and sodium salt thereof can be mentioned.

The solid electrolytic capacitor in the present exemplary embodiment includes the second additive instead of the first additive used in the first exemplary embodiment, and it can be manufactured by the same method as in the first exemplary embodiment. That is, submicron carbon particles are dispersed in water by 2 to 10 wt %. The second additive is mixed and dispersed in this dispersed fluid. The carbon-containing liquid thus prepared is applied to the surface of solid electrolyte layer 13 of anode body 11 formed with dielectric oxide layer 12 and solid electrolyte layer 13. After that, solvent component is removed at a high temperature ranging from 130° C. to 215° C. to form carbon layer 14A. For applying the carbon-containing liquid to the surface of solid electrolyte layer 13, anode body 11 formed with solid electrolyte layer 13 is immersed in the carbon-containing liquid. Or, a member such as a roller or sponge holding the carbon-containing liquid is abutted to anode body 11 formed with solid electrolyte layer 13. Thereafter, conductor layer 14B is formed on the surface of carbon layer 14A to make capacitor element 15, and it is covered with exterior resin 19, after connecting anode terminal 16 and cathode terminal 18. The solid electrolytic capacitor is manufactured in this way.

Also, the same as in the first exemplary embodiment, carbon layer 14A is possible to contain the aromatic compound represented by general formula (1) in addition to the second additive. Further, in the process of forming carbon layer 14A, it is possible to add a surface-active agent in order to dissolve the aromatic compound represented by general formula (1).

In the present exemplary embodiment, carbon layer 14A contains the second additive formed from at least one of those selected from a condensation product of an aromatic sulfonic acid with formaldehyde, polystyrene sulfonic acid, or salts thereof. In this configuration, the adhesion of carbon layer 14A to solid electrolyte layer 13 can be maintained even in a high temperature environment. Accordingly, peeling of carbon layer 14A can be suppressed. As a result, it is possible to prevent the interface resistance from increasing between solid electrolyte layer 13 and carbon layer 14A. Also, the increase in specific resistance of solid electrolyte layer 13, itself, can be prevented by suppressing the intrusion of external oxygen or water. Accordingly, it is possible to manufacture a solid electrolytic capacitor that undergoes less successive change of ESR.

The ratio of the second additive contained in carbon layer 14A is preferably in a range of 0.06 to 1.25 inclusive, referred to the carbon particles as 1 in weight. According to the content, in a high temperature environment, the action of maintaining the adhesion of carbon layer 14A to solid electrolyte layer 13 is enhanced. When the ratio of the second additive is less than 0.06 referred to the carbon particles as 1 in weight, the action of maintaining the adhesion of carbon layer 14A to solid electrolyte layer 13 is not sufficient in a high temperature environment. On the other hand, in a range of exceeding 1.25, the specific resistance of carbon layer 14A increases and results in increase of ESR.

As the condensation product of an aromatic sulfonic acid with formaldehyde, it is preferable to use a condensation product of phenol sulfonic acid with formaldehyde. The condensation product is especially greater in the action of maintaining the adhesion of carbon layer 14A to solid electrolyte layer 13 in a high temperature environment. Accordingly, it is possible to manufacture a solid electrolytic capacitor that undergoes very slight successive change of ESR. It is also preferable to use a salt thereof for the same reason.

When polystyrene sulfonic acid and/or its salt are used, the molecular weight thereof is preferably in a range from 10,000 to 1,000,000 inclusive. Such a second additive is greater in the action of maintaining the adhesion of carbon layer 14A to solid electrolyte layer 13 in a high temperature environment. When the molecular weight of polystyrene sulfonic acid or its salt is less than 10,000, the action of maintaining the adhesion of carbon layer 14A to solid electrolyte layer 13 is not sufficient in a high temperature environment. In a range of exceeding 1,000,000, the specific resistance of carbon layer 14A increases and results in increase of ESR.

As a method of forming carbon layer 14A on the surface of solid electrolyte layer 13, the same as in the first exemplary embodiment, it is preferable to employ a method of applying a turbid liquid containing the second additive and carbon particles to the surface of solid electrolyte layer 13, followed by drying. Carbon layer 14A being dense and uniform in quality can be formed on the surface of solid electrolyte layer 13 by using this method. Consequently, the adhesion of carbon layer 14A to solid electrolyte layer 13 can be enhanced. In this case, more preferable conditions are same as in the first exemplary embodiment.

Furthermore, carbon layer 14A preferably contains the aromatic compound represented by general formula (1) in addition to the carbon particles and the second additive. The effects obtained by this configuration are same as in the first exemplary embodiment. In this case, the preferable range of content ratio of the aromatic compound represented by general formula (1) contained in carbon layer 14A is also same as in the first exemplary embodiment. That is, it is preferably ranges from 0.1 to 1.8 referred to the carbon particles as 1 in weight. In addition, it is best to use catechol or pyrogallol as the aromatic compound represented by general formula (1), as same as in the first exemplary embodiment.

Thus, it is preferable to form carbon layer 14A containing the second additive and the aromatic compound represented by general formula (1) by using the same method as in the first exemplary embodiment. The reason is also same as in the first exemplary embodiment.

Also, in the process of drying the turbid liquid containing the second additive, the carbon particles, and the aromatic compound represented by general formula (1), it is preferable to perform the drying near the melting point of the second additive and the aromatic compound represented by general formula (1). In this way, the adhesion of carbon layer 14A to solid electrolyte layer 13 can be enhanced, and it is possible to reduce the interface resistance thereof.

However, solid electrolyte layer 13 is made of a conductive polymer such as polypyrrole. Accordingly, in case the drying temperature is higher than 215° C., the specific resistance of solid electrolyte layer 13 will increase. On the other hand, in case the drying temperature is lower than 130° C., it will be unable to completely remove the water in the turbid liquid. As a result, solid electrolyte layer 13 and carbon layer 14A will not sufficiently adhere to each other.

Therefore, it is preferable to use a second additive whose melting point is in a range from 130° C. to 215° C. inclusive and an aromatic compound represented by general formula (1) which has a similar melting point. In this configuration, the adhesion of carbon layer 14A to solid electrolyte layer 13 is enhanced. Accordingly, the interface resistance therebetween can be lowered, and in addition, it is possible to prevent the specific resistance of solid electrolyte layer 13 from increasing. As a result, ESR of the solid electrolytic capacitor can be decreased. Similar effects can be obtained by applying an aromatic compound represented by general formula (1) of which the melting point ranges from 130° C. to 215° C. inclusive to the first exemplary embodiment.

The following compounds can be mentioned as specific examples of the second additive whose melting point is in a range from 130° C. to 215° C. inclusive. Available as examples of the condensation product of an aromatic sulfonic acid with formaldehyde and its salt are a condensation product of aryl phenol sulfonic acid with formaldehyde, a condensation product of phenol sulfonic acid with formaldehyde, a condensation product of anthraquinone sulfonic acid with formaldehyde, a condensation product of naphthalene sulfonic acid with formaldehyde, and sodium salts of these. Also, as an example of the polystyrene sulfonate, sodium polystyrene sulfonate can be mentioned. As an example of the aromatic compound represented by general formula (1), catechol and pyrogallol can be mentioned.

As specific examples in the present exemplary embodiment, various compounds as the second additive will be described in the following, using pyrogallol as the aromatic compound represented by general formula (1). In the following description, the results of evaluation of solid electrolytic capacitors actually manufactured are described, but the basic configuration is same as in the first exemplary embodiment, and the detailed description may be omitted.

In the present exemplary embodiment, samples CA through CY, DA through DD having such specifications as shown in Table 2 and Table 3 are formed and evaluated. That is, as to sample CA, in the manufacturing process of sample AA of the first exemplary embodiment, instead of magnesium aluminum silicate used as the first additive, the condensation product of phenol sulfonic acid with formaldehyde is used as the second additive. That is, dielectric oxide layer 12 is first formed on the surface of anode body 11. In this case, anode body 11 is immersed in 0.3 wt % ammonium dihydrogen phosphate aqueous solution at the solution temperature of 70° C., and 6V DC voltage is applied thereto for 20 minutes. Further, solid electrolyte layer 13 is formed thereon in the same way as for sample AA. And, carbon layer 14A is formed according to the following procedure.

First, 5 wt % of carbon particles and 0.3 wt % of the condensation product of phenol sulfonic acid with formaldehyde are mixed and dispersed in water, and ammonia is added thereto to prepare a carbon-containing liquid of pH10. Anode body 11 formed with solid electrolyte layer 13 is immersed in the carbon-containing liquid, then taken out, and dried at 215° C. to remove the solvent component. In this way, carbon layer 14A is formed. In this case, in carbon layer 14A, the condensation product of phenol sulfonic acid with formaldehyde is contained at a ratio of 0.06 referred to the carbon particles as 1 in weight, which is uniformly dispersed in carbon layer 14A.

Subsequently, the same as in sample AA, conductor layer 14B is formed on the surface of carbon layer 14A to manufacture capacitor element 15. The effective region of anode body 11 except anode lead-out portion 11A is 3.2 mm×3.9 mm. Also, the rated values of capacitor element 15 are 4.0WV, 47 μF.

When manufacturing capacitor element 15 of sample CB, the composition of a carbon-containing liquid for forming carbon layer 14A is changed. That is, 5 wt % of the carbon particles and 2.5 wt % of the condensation product of phenol sulfonic acid with formaldehyde are mixed and dispersed in water, and ammonia is added thereto to prepare the carbon-containing liquid of pH10 to be used. The solid electrolytic capacitor of sample CB is manufactured as same as that of sample CA except for this. In this case, in carbon layer 14A, the condensation product of phenol sulfonic acid with formaldehyde is contained at a ratio of 0.5 referred to the carbon particles as 1 in weight, which is uniformly dispersed in carbon layer 14A.

When manufacturing capacitor element 15 of sample CC, the composition of a carbon-containing liquid for forming carbon layer 14A is further changed. That is, 5 wt % of the carbon particles and 6.25 wt % of the condensation product of phenol sulfonic acid with formaldehyde are mixed and dispersed in water, and ammonia is added thereto to prepare the carbon-containing liquid of pH10 to be used. The solid electrolytic capacitor of sample CC is manufactured as same as that of sample CA except for this. In this case, in carbon layer 14A, the condensation product of phenol sulfonic acid with formaldehyde is contained at a ratio of 1.25 referred to the carbon particles as 1 in weight, which is uniformly dispersed in carbon layer 14A.

When manufacturing capacitor element 15 of sample CD, the composition of a carbon-containing liquid for forming carbon layer 14A is further changed. That is, 5 wt % of the carbon particles and 0.3 wt % of sodium naphthalene sulfonate formaldehyde condensate are mixed and dispersed in water, and ammonia is added thereto to prepare the carbon-containing liquid of pH10 to be used. The solid electrolytic capacitor of sample CD is manufactured as same as that of sample CA except for this. In this case, in carbon layer 14A, sodium naphthalene sulfonate formaldehyde condensate is contained at a ratio of 0.06 referred to the carbon particles as 1 in weight, which is uniformly dispersed in carbon layer 14A.

When manufacturing capacitor element 15 of sample CE, the composition of a carbon-containing liquid for forming carbon layer 14A is further changed. That is, 5 wt % of the carbon particles and 0.3 wt % of the condensation product of aryl phenol sulfonic acid with formaldehyde are mixed and dispersed in water, and ammonia is added thereto to prepare the carbon-containing liquid of pH10 to be used. The solid electrolytic capacitor of sample CE is manufactured as same as that of sample CA except for this. In this case, in carbon layer 14A, the condensation product of aryl phenol sulfonic acid with formaldehyde is contained at a ratio of 0.06 referred to the carbon particles as 1 in weight, which is uniformly dispersed in carbon layer 14A.

When manufacturing capacitor element 15 of sample CF, the composition of a carbon-containing liquid for forming carbon layer 14A is further changed. That is, 5 wt % of the carbon particles and 0.3 wt % of sodium polystyrene sulfonate (molecular weight is 10,000) are mixed and dispersed in water, and ammonia is added thereto to prepare the carbon-containing liquid of pH10 to be used. The solid electrolytic capacitor of sample CF is manufactured as same as that of sample CA except for this. In this case, in carbon layer 14A, sodium polystyrene sulfonate is contained at a ratio of 0.06 referred to the carbon particles as 1 in weight, which is uniformly dispersed in carbon layer 14A.

When manufacturing capacitor element 15 of sample CG, sodium polystyrene sulfonate of molecular weight of 1,000,000 is used as the second additive. The solid electrolytic capacitor of sample CG is manufactured as same as that of sample CF except for this. In this case, in carbon layer 14A, sodium polystyrene sulfonate is contained at a ratio of 0.06 referred to the carbon particles as 1 in weight, which is uniformly dispersed in carbon layer 14A.

When manufacturing capacitor element 15 of sample CH, the composition of a carbon-containing liquid for forming carbon layer 14A is further changed. That is, 5 wt % of the carbon particles and 2.5 wt % of sodium polystyrene sulfonate (molecular weight is 20,000) are mixed and dispersed in water, and ammonia is added thereto to prepare the carbon-containing liquid of pH10 to be used. The solid electrolytic capacitor of sample CH is manufactured as same as that of sample CA except for this. In this case, in carbon layer 14A, sodium polystyrene sulfonate is contained at a ratio of 0.5 referred to the carbon particles as 1 in weight, which is uniformly dispersed in carbon layer 14A.

When manufacturing capacitor element 15 of sample CJ, the composition of a carbon-containing liquid for forming carbon layer 14A is further changed. That is, 5 wt % of the carbon particles and 6.25 wt % of sodium polystyrene sulfonate (molecular weight is 10,000) are mixed and dispersed in water, and ammonia is added thereto to prepare the carbon-containing liquid of pH10 to be used. The solid electrolytic capacitor of sample CJ is manufactured as same as that of sample CA except for this. In this case, in carbon layer 14A, sodium polystyrene sulfonate is contained at a ratio of 1.25 referred to the carbon particles as 1 in weight, which is uniformly dispersed in carbon layer 14A.

When manufacturing capacitor element 15 of sample CK, sodium polystyrene sulfonate of molecular weight of 1,000,000 is used as the second additive. The solid electrolytic capacitor of sample CK is manufactured as same as that of sample CJ except for this. In this case, in carbon layer 14A, sodium polystyrene sulfonate is contained at a ratio of 1.25 referred to the carbon particles as 1 in weight, which is uniformly dispersed in carbon layer 14A.

When manufacturing capacitor element 15 of sample CL, the composition of a carbon-containing liquid for forming carbon layer 14A is further changed. That is, 5 wt % of the carbon particles and 0.3 wt % of polystyrene sulfonic acid (molecular weight is 10,000) are mixed and dispersed in water, and ammonia is added thereto to prepare the carbon-containing liquid of pH10 to be used. The solid electrolytic capacitor of sample CL is manufactured as same as that of sample CA except for this. In this case, in carbon layer 14A, polystyrene sulfonic acid is contained at a ratio of 0.06 referred to the carbon particles as 1 in weight, which is uniformly dispersed in carbon layer 14A.

When manufacturing capacitor element 15 of sample CM, the composition of a carbon-containing liquid for forming carbon layer 14A is further changed. That is, 5 wt % of the carbon particles, 0.3 wt % of the condensation product of phenol sulfonic acid with formaldehyde, and 0.5 wt % of pyrogallol are mixed and dispersed in water, and ammonia is added thereto to prepare the carbon-containing liquid of pH10 to be used. The solid electrolytic capacitor of sample CM is manufactured as same as that of sample CA except for this. In this case, in carbon layer 14A, the condensation product of phenol sulfonic acid with formaldehyde and pyrogallol are contained respectively at ratios of 0.06 and 0.1 referred to the carbon particles as 1 in weight, which are uniformly dispersed in carbon layer 14A.

When manufacturing capacitor element 15 of sample CN, solid electrolyte layer 13 immersed and coated with the carbon-containing liquid is dried at 130° C. The solid electrolytic capacitor of sample CN is manufactured as same as that of sample CM except for this. In this case, in carbon layer 14A, the condensation product of phenol sulfonic acid with formaldehyde and pyrogallol are contained respectively at ratios of 0.06 and 0.1 referred to the carbon particles as 1 in weight, which are uniformly dispersed in carbon layer 14A.

When manufacturing capacitor element 15 of sample CP, the composition of a carbon-containing liquid for forming carbon layer 14A is further changed. That is, 5 wt % of the carbon particles, 0.3 wt % of the condensation product of phenol sulfonic acid with formaldehyde, and 5 wt % of pyrogallol are mixed and dispersed in water, and ammonia is added thereto to prepare the carbon-containing liquid of pH10 to be used. The solid electrolytic capacitor of sample CP is manufactured as same as that of sample CA except for this. In this case, in carbon layer 14A, the condensation product of phenol sulfonic acid with formaldehyde and pyrogallol are contained respectively at ratios of 0.06 and 1 referred to the carbon particles as 1 in weight, which are uniformly dispersed in carbon layer 14A.

When manufacturing capacitor element 15 of sample CQ, the composition of a carbon-containing liquid for forming carbon layer 14A is further changed. That is, 5 wt % of the carbon particles, 0.3 wt % of the condensation product of phenol sulfonic acid with formaldehyde, and 9 wt % of pyrogallol are mixed and dispersed in water, and ammonia is added thereto to prepare the carbon-containing liquid of pH10 to be used. The solid electrolytic capacitor of sample CQ is manufactured as same as that of sample CA except for this. In this case, in carbon layer 14A, the condensation product of phenol sulfonic acid with formaldehyde and pyrogallol are contained respectively at ratios of 0.06 and 1.8 referred to the carbon particles as 1 in weight, which are uniformly dispersed in carbon layer 14A.

When manufacturing capacitor element 15 of sample CR, the composition of a carbon-containing liquid for forming carbon layer 14A is further changed. That is, 5 wt % of the carbon particles, 0.3 wt % of sodium naphthalene sulfonate formaldehyde condensate, and 0.5 wt % of pyrogallol are mixed and dispersed in water, and ammonia is added thereto to prepare the carbon-containing liquid of pH10 to be used. The solid electrolytic capacitor of sample CR is manufactured as same as that of sample CA except for this. In this case, in carbon layer 14A, sodium naphthalene sulfonate formaldehyde condensate and pyrogallol are contained respectively at ratios of 0.06 and 0.1 referred to the carbon particles as 1 in weight, which are uniformly dispersed in carbon layer 14A.

When manufacturing capacitor element 15 of sample CS, the composition of a carbon-containing liquid for forming carbon layer 14A is further changed. That is, 5 wt % of the carbon particle, 0.3 wt % of the condensation product of aryl phenol sulfonic acid with formaldehyde, and 0.5 wt % of pyrogallol are mixed and dispersed in water, and ammonia is added thereto to prepare the carbon-containing liquid of pH10 to be used. The solid electrolytic capacitor of sample CS is manufactured as same as that of sample CA except for this. In this case, in carbon layer 14A, the condensation product of aryl phenol sulfonic acid with formaldehyde and pyrogallol are contained respectively at ratios of 0.06 and 0.1 referred to the carbon particles as 1 in weight, which are uniformly dispersed in carbon layer 14A.

When manufacturing capacitor element 15 of sample CT, the composition of a carbon-containing liquid for forming carbon layer 14A is further changed. That is, 5 wt % of the carbon particles, 0.3 wt % of sodium polystyrene sulfonate (molecular weight is 10,000), and 0.5 wt % of pyrogallol are mixed and dispersed in water, and ammonia is added thereto to prepare the carbon-containing liquid of pH10 to be used. The solid electrolytic capacitor of sample CT is manufactured as same as that of sample CA except for this. In this case, in carbon layer 14A, sodium polystyrene sulfonate and pyrogallol are contained respectively at ratios of 0.06 and 0.1 referred to the carbon particles as 1 in weight, which are uniformly dispersed in carbon layer 14A.

When manufacturing capacitor element 15 of sample CU, sodium polystyrene sulfonate of molecular weight of 1,000,000 is used. The solid electrolytic capacitor of sample CU is manufactured as same as that of sample CT except for this. In this case, in carbon layer 14A, sodium polystyrene sulfonate and pyrogallol are contained respectively at ratios of 0.06 and 0.1 referred to the carbon particles as 1 in weight, which are uniformly dispersed in carbon layer 14A.

When manufacturing capacitor element 15 of sample CV, the composition of a carbon-containing liquid for forming carbon layer 14A is further changed. That is, 5 wt % of the carbon particles, 0.3 wt % of sodium polystyrene sulfonate (molecular weight is 20,000), and 5 wt % of pyrogallol are mixed and dispersed in water, and ammonia is added thereto to prepare the carbon-containing liquid of pH10 to be used. The solid electrolytic capacitor of sample CV is manufactured as same as that of sample CA except for this. In this case, in carbon layer 14A, sodium polystyrene sulfonate and pyrogallol are contained respectively at ratios of 0.06 and 1 referred to the carbon particles as 1 in weight, which are uniformly dispersed in carbon layer 14A.

When manufacturing capacitor element 15 of sample CW, the composition of a carbon-containing liquid for forming carbon layer 14A is further changed. That is, 5 wt % of the carbon particles, 0.3 wt % of sodium polystyrene sulfonate (molecular weight is 10,000), and 9 wt % of pyrogallol are mixed and dispersed in water, and ammonia is added thereto to prepare the carbon-containing liquid of pH10 to be used. The solid electrolytic capacitor of sample CW is manufactured as same as that of sample CA except for this. In this case, in carbon layer 14A, sodium polystyrene sulfonate and pyrogallol are contained respectively at ratios of 0.06 and 1.8 referred to the carbon particles as 1 in weight, which are uniformly dispersed in carbon layer 14A.

When manufacturing capacitor element 15 of sample CX, sodium polystyrene sulfonate of molecular weight of 1,000,000 is used. The solid electrolytic capacitor of sample CX is manufactured as same as that of sample CW except for this. In this case, in carbon layer 14A, sodium polystyrene sulfonate and pyrogallol are contained respectively at ratios of 0.06 and 1.8 referred to the carbon particles as 1 in weight, which are uniformly dispersed in carbon layer 14A.

When manufacturing capacitor element 15 of sample CY, the composition of a carbon-containing liquid for forming carbon layer 14A is further changed. That is, 5 wt % of the carbon particles, 0.3 wt % of polystyrene sulfonic acid (molecular weight is 10,000), and 0.5 wt % of pyrogallol are mixed and dispersed in water, and ammonia is added thereto to prepare the carbon-containing liquid of pH10 to be used. The solid electrolytic capacitor of sample CY is manufactured as same as that of sample CA except for this. In this case, in carbon layer 14A, sodium polystyrene sulfonate and pyrogallol are contained respectively at ratios of 0.06 and 0.1 referred to the carbon particles as 1 in weight, which are uniformly dispersed in carbon layer 14A.

When manufacturing capacitor element 15 of sample DA, the composition of a carbon-containing liquid for forming carbon layer 14A is further changed. That is, 5 wt % of the carbon particles and 0.3 wt % of polyethylene glycol lauryl ether are mixed and dispersed in water, and ammonia is added thereto to prepare the carbon-containing liquid of pH10 to be used. Note here that polyethylene glycol lauryl ether is synthesized from polyethylene glycol, which is synthesized by an accretion reaction of 8 molecules of ethylene oxide, and lauryl alcohol. Polyethylene glycol lauryl ether is not used as the second additive in the present invention. The solid electrolytic capacitor of sample DA is manufactured as same as that of sample CA except for this. In this case, in carbon layer 14A, polyethylene glycol lauryl ether is contained at a ratio of 0.06 referred to the carbon particles as 1 in weight, which is uniformly dispersed in carbon layer 14A.

When manufacturing capacitor element 15 of sample DB, the composition of a carbon-containing liquid for forming carbon layer 14A is further changed. That is, 5 wt % of the carbon particles and 0.3 wt % sodium branched dodecyl benzene sulfonate are mixed and dispersed in water, and ammonia is added thereto to prepare the carbon-containing liquid of pH10 to be used. Sodium branched dodecyl benzene sulfonate is not used as the second additive in the present invention. The solid electrolytic capacitor of sample DB is manufactured as same as that of sample CA except for this. In this case, in carbon layer 14A, sodium branched dodecyl benzene sulfonate is contained at a ratio of 0.06 referred to the carbon particles as 1 in weight, which is uniformly dispersed in carbon layer 14A.

When manufacturing capacitor element 15 of sample DC, 5 wt % of the carbon particles are suspended in water, and ammonia is added thereto to prepare the carbon-containing liquid of pH10 to be used. The solid electrolytic capacitor of sample DC is manufactured as same as that of sample CA except for this.

When manufacturing capacitor element 15 of sample DD, 5 wt % of the carbon particles and 0.5 wt % of pyrogallol are mixed and dispersed in water, and ammonia is added thereto to prepare the carbon-containing liquid of pH10 to be used. The solid electrolytic capacitor of sample DD is manufactured as same as that of sample CA except for this. In this case, in carbon layer 14A, pyrogallol is contained at a ratio of 0.1 referred to the carbon particles as 1 in weight, which is uniformly dispersed in carbon layer 14A.

TABLE 2

| Sample | Carbon particle | Second additive Material | Second additive Quantity | Pyrogallol | Others Material | Others Quantity |
|---|---|---|---|---|---|---|
| CA | 1(5) | PSH | 0.06(0.3) | — | — | — |
| CB | 1(5) | PSH | 0.5(2.5) | — | — | — |
| CC | 1(5) | PSH | 1.25(6.25) | — | — | — |
| CD | 1(5) | NSSH | 0.06(0.3) | — | — | — |
| CE | 1(5) | ASH | 0.06(0.3) | — | — | — |
| CF | 1(5) | PSSS1 | 0.06(0.3) | — | — | — |
| CG | 1(5) | PSSS2 | 0.06(0.3) | — | — | — |

TABLE 2-continued

Content ratio in carbon layer and content in turbid liquid (wt %)

| Sample | Carbon particle | Second additive Material | Second additive Quantity | Pyro-gallol | Others Material | Others Quantity |
|---|---|---|---|---|---|---|
| CH | 1(5) | PSSS3 | 0.5(2.5) | — | — | — |
| CJ | 1(5) | PSSS1 | 1.25(6.25) | — | — | — |
| CK | 1(5) | PSSS2 | 1.25(6.25) | — | — | — |
| CL | 1(5) | PSSS1 | 0.06(0.3) | — | — | — |
| DA | 1(5) | — | — | — | PEGL | 0.06(0.3) |
| DB | 1(5) | — | — | — | DBSS | 0.06(0.3) |
| DC | 1(5) | — | — | — | — | — |

Parenthesized value is the content in turbid liquid (wt %).
PSH: Condensation product of phenol sulfonic acid with formaldehyde
NSSH: Sodium naphthalene sulfonate formaldehyde condensate
ASH: Condensation product of aryl phenol sulfonic acid with formaldehyde
PSSS1: Sodium polystyrene sulfonate (molecular weight is 10,000)
PSSS2: Sodium polystyrene sulfonate (molecular weight is 1,000,000)
PSSS3: Sodium polystyrene sulfonate (molecular weight is 20,000)
PEGL: Polyethylene glycol lauryl ether
DBSS: Sodium branched dodecyl benzene sulfonate

TABLE 3

Content ratio in carbon layer and content in turbid liquid (wt %)

| Sample | Carbon particle | Second additive Material | Second additive Quantity | Pyro-gallol | Others Material | Others Quantity |
|---|---|---|---|---|---|---|
| CM | 1(5) | PSH | 0.06(0.3) | 0.1(0.5) | — | — |
| CN | 1(5) | PSH | 0.06(0.3) | 0.1(0.5) | — | — |
| CP | 1(5) | PSH | 0.06(0.3) | 1(5) | — | — |
| CQ | 1(5) | PSH | 0.06(0.3) | 1.8(9) | — | — |
| CR | 1(5) | NSSH | 0.06(0.3) | 0.1(0.5) | — | — |
| CS | 1(5) | ASH | 0.06(0.3) | 0.1(0.5) | — | — |
| CT | 1(5) | PSSS1 | 0.06(0.3) | 0.1(0.5) | — | — |
| CU | 1(5) | PSSS2 | 0.06(0.3) | 0.1(0.5) | — | — |
| CV | 1(5) | PSSS3 | 0.06(0.3) | 1(5) | — | — |
| CW | 1(5) | PSSS1 | 0.06(0.3) | 1.8(9) | — | — |
| CX | 1(5) | PSSS2 | 0.06(0.3) | 1.8(9) | — | — |
| CY | 1(5) | PSSS1 | 0.06(0.3) | 0.1(0.5) | — | — |
| DD | 1(5) | — | — | 0.1(0.5) | — | — |

Parenthesized value is the content in turbid liquid (wt %).
The abbreviations are same as in Table 2.

Capacitor elements 15 of samples CA through CY and samples DA through DD thus manufactured are evaluated with respect to electrostatic capacity C and ESR. In that case, before and after leaving at 125° C. for 500 hours, electrostatic capacity C and ESR are measured and the rate of change in capacity (ΔC) and the rate of change in ESR (ΔESR) before and after leaving are calculated. The evaluated results of each sample are shown in Table 4. The measuring conditions are same as for the solid electrolytic capacitor in the first exemplary embodiment.

Also, anode terminal 16 is welded to anode lead-out portion 1A of capacitor element 15 of each sample, and cathode terminal 18 is connected to conductor layer 14B by using conductive adhesive. After that, capacitor element 15 is covered with insulating exterior resin 19 in such a manner that respective connections 16A, 18A of anode terminal 16 and cathode terminal 18 are exposed. In this way, the solid electrolytic capacitor of each sample is manufactured. The size of the solid electrolytic capacitor is 7.3×4.3×2.8 mm, and the rated values are 4.0 WV, 47 μF.

The solid electrolytic capacitor of each sample thus manufactured is evaluated in the same way as in the first exemplary embodiment. That is, after leaving at 105° C. for 1,000 hours, the rate of change in capacity (ΔC) and the rate of change in ESR (ΔESR) are calculated. The calculated results are also shown in Table 4.

TABLE 4

| | Capacitor element | | | | Capacitor | |
|---|---|---|---|---|---|---|
| | Initial | | After leaving | | After leaving | |
| Sample | C (μF) | ESR (mΩ) | ΔC (%) | Δ ECR (%) | ΔC (%) | Δ ECR (%) |
| CA | 47.6 | 11.4 | −8.8 | 279 | −2.8 | 5.8 |
| CB | 47.8 | 11.7 | −8.7 | 271 | −2.7 | 5.5 |
| CC | 47.9 | 12.3 | −8.4 | 263 | −2.4 | 5.3 |
| CD | 47.4 | 11.5 | −9.3 | 291 | −3.3 | 5.7 |
| CE | 47.5 | 11.6 | −10.1 | 305 | −4.1 | 6.2 |
| CF | 47.6 | 11.3 | −8.5 | 232 | −2.5 | 5.0 |
| CG | 47.5 | 11.6 | −8.4 | 221 | −2.4 | 4.5 |
| CH | 47.9 | 11.7 | −8.2 | 213 | −2.2 | 4.1 |
| CJ | 47.5 | 12.4 | −8.0 | 217 | −2.0 | 4.1 |
| CK | 47.4 | 12.1 | −7.9 | 211 | −1.9 | 4.2 |
| CL | 47.4 | 11.6 | −8.6 | 235 | −2.6 | 4.7 |
| CM | 47.6 | 11.5 | −7.6 | 159 | −1.6 | 2.9 |
| CN | 47.0 | 11.9 | −7.9 | 165 | −1.9 | 3.1 |
| CP | 47.7 | 11.6 | −7.4 | 125 | −1.4 | 2.6 |
| CQ | 47.7 | 12.4 | −7.1 | 120 | −1.1 | 2.6 |
| CR | 47.5 | 11.6 | −8.6 | 133 | −2.6 | 2.9 |
| CS | 47.6 | 11.8 | −9.1 | 151 | −3.1 | 3.2 |
| CT | 47.5 | 11.4 | −7.3 | 119 | −1.3 | 2.1 |
| CU | 47.7 | 11.7 | −7.1 | 115 | −1.1 | 1.8 |
| CV | 47.9 | 11.8 | −7.1 | 109 | −1.1 | 1.2 |
| CW | 47.4 | 12.4 | −6.9 | 114 | −0.9 | 2.3 |
| CX | 47.3 | 12.2 | −6.8 | 113 | −0.8 | 2.3 |
| CY | 47.5 | 11.7 | −7.5 | 120 | −1.5 | 2.0 |
| DA | 47.8 | 13.9 | −13.9 | 710 | −7.9 | 15.0 |
| DB | 47.6 | 12.3 | −12.4 | 605 | −6.4 | 12.5 |
| DC | 45.8 | 22.4 | −30.8 | 805 | −14.8 | 200.0 |
| DD | 47.4 | 13.5 | −13.3 | 355 | −7.3 | 7.0 |

In capacitor elements 15 of samples CA through CL, carbon layer 14A contains the condensation product of an aromatic sulfonic acid with formaldehyde, polystyrene sulfonic acid, or salt thereof. Accordingly, as is obvious in Table 4, ΔESR values when left in a high temperature environment are decreased in these samples with respect to in samples DA and DB. In sample DA, carbon layer 14A contains polyethylene glycol lauryl ether, and in sample DB, it contains sodium branched dodecyl benzene sulfonate.

In capacitor elements 15 of samples CA through CC, the content ratios of the condensation product of phenol sulfonic acid with formaldehyde in carbon layer 14A referred to the carbon particles as 1 in weight are different from each other. As is obvious in Table 4, setting the content ratio of the condensation product of phenol sulfonic acid with formaldehyde to a range from 0.06 to 1.25 inclusive referred to the carbon particles as 1 in weight, it is possible to reliably suppress ΔESR.

In sample CA, as a condensation product of an aromatic sulfonic acid with formaldehyde contained in carbon layer 14A, the condensation product of phenol sulfonic acid with formaldehyde is used. On the other hand, in samples CD, CE, other condensation products of aromatic sulfonic acid with formaldehydes are used. It is clear that sample CA is less in change of ESR in particular as compared with samples CD, CE.

In capacitor elements 15 of samples CF through CL, the molecular weight and content ratios of sodium polystyrene sulfonate in carbon layer 14A referred to the carbon particles in weight are changed. As is obvious in Table 4, setting the molecular weight of sodium polystyrene sulfonate to a range from 10,000 to 1,000,000 inclusive, it is possible to reliably suppress ΔESR. Also, setting the content ratio of sodium polystyrene sulfonate to a range from 0.06 to 1.25 inclusive referred to the carbon particles as 1 in weight, it is possible to reliably suppress ΔESR.

In capacitor element 15 of sample DD, carbon layer 14A contains pyrogallol that is the aromatic compound represented by general formula (1). In this content, the initial characteristics of electrostatic capacity C and ESR are also improved as compared with sample DC, and ΔESR after leaving at 125° C. for 500 hours is lowered.

On the other hand, in capacitor elements 15 shown in samples CM through CY, carbon layer 14A contains both of the second additive and pyrogallol. Accordingly, it can be considered that the action of maintaining the adhesion of carbon layer 14A to solid electrolyte layer 13 in a high temperature environment is synergistically enhanced. As a result, ΔESR is lowered as compared with samples CA through CL in which carbon layer 14A contains only the second additive and sample DD in which carbon layer 14A contains only pyrogallol.

In capacitor elements 15 of sample CM through CY, the content ratio of pyrogallol with respect to the carbon particles is changed in carbon layer 14A. As is obvious in Table 4, setting the content ratio of pyrogallol to a range from 0.1 to 1.8 inclusive referred to the carbon particles as 1 in weight, it is possible to reliably suppress ΔESR.

Further, in capacitor elements 15 of samples CM, CN, when carbon layer 14A is formed, the temperature for drying solid electrolyte layer 13 with the carbon-containing liquid applied thereto is changed. Setting the drying temperature to a range from 130° C. to 215° C. inclusive, it is possible to reliably suppress ΔESR.

In the above description, the evaluated results of capacitor element 15 are described, but the evaluated results of solid electrolytic capacitors also display a similar tendency as shown in Table 4.

Also, in the above examples, the condensation product of phenol sulfonic acid with formaldehyde, the condensation product of naphthalene sulfonic acid with formaldehyde, the condensation product of aryl phenol sulfonic acid with formaldehyde, and sodium polystyrene sulfonate are used as the second additive in the description. It is also preferable to use other materials such as other condensation product of an aromatic sulfonic acid with formaldehyde, polystyrene sulfonic acid, or salts thereof. Also, pyrogallol is used as the aromatic compound represented by general formula (1) in the description. However, the present invention is not limited to this combination. It is also possible to use other aromatic compound represented by general formula (1) the same as in the first exemplary embodiment.

As described above, in the solid electrolytic capacitor of the present invention, the carbon layer contains the carbon particles and the first additive or the second additive. The first additive is formed from at least one of those selected from the group consisting of hydrated silica and silicate. The second additive is formed from at least one of those selected from the group consisting of a condensation product of an aromatic sulfonic acid with formaldehyde, a condensation product of an aromatic sulfonate with formaldehyde, polystyrene sulfonic acid, and polystyrene sulfonate. In this configuration, even in a high temperature environment, the adhesion of the carbon layer to the solid electrolyte layer is maintained, and therefore, peeling of the carbon layer can be suppressed. As a result, it is possible to prevent the interface resistance from increasing between the solid electrolyte layer and the carbon layer. Also, the increase of specific resistance of the solid electrolyte itself can be prevented by suppressing the intrusion of external oxygen. Accordingly, it is possible to manufacture a solid electrolytic capacitor that undergoes less successive change of ESR. The solid electrolytic capacitor is useful for various types of electronic equipment.

What is claimed is:
1. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer contains magnesium aluminum silicate as the first additive.
2. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer further contains an aromatic compound represented by general formula (1),

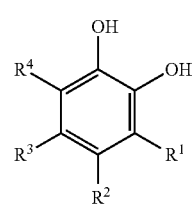

(1)

where $R^1$ to $R^4$ are each hydrogen atom, hydroxyl group, carboxyl group, or alkyl group; and
wherein the carbon layer contains the first additive and the aromatic compound, and a ratio of the first additive is at least 0.06 and at most 0.9 and a ratio of the aromatic compound is at least 0.1 and at most 1.8, both referred to the carbon particles as 1 in weight.

3. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer contains as the second additive at least one of polystyrene sulfonic acid of which molecular weight is at least 10,000 and at most 1,000,000, and polystyrene sulfonate of which molecular weight is at least 10,000 and at most 1,000,000.

4. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer contains as the second additive at least one of the condensation product of an aromatic sulfonic acid with formaldehyde and the condensation product of an aromatic sulfonate with formaldehyde, and
the condensation product of an aromatic sulfonic acid with formaldehyde is at least one of those selected from a group consisting of a condensation product of aryl phenol sulfonic acid with formaldehyde, a condensation product of phenol sulfonic acid with formaldehyde, a condensation product of anthraquinone sulfonic acid with formaldehyde, and a condensation product of naphthalene sulfonic acid with formaldehyde, and
the condensation product of an aromatic sulfonate with formaldehyde is at least one of those selected from a group consisting of a condensation product of aryl phenol sulfonate with formaldehyde, a condensation product of phenol sulfonate with formaldehyde, a condensation product of anthraquinone sulfonate with formaldehyde, and a condensation product of naphthalene sulfonate with formaldehyde.

5. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer contains sodium polystyrene sulfonate as the second additive.

6. A solid electrolytic capacitor comprising:
an anode body made of a valve metal;
a dielectric oxide layer formed on the anode body;
a solid electrolyte layer formed on the dielectric oxide layer;
a carbon layer formed on the solid electrolyte layer, the carbon layer containing carbon particles, and
one of a first additive and a second additive,
the first additive being formed from at least one of those selected from a group consisting of hydrated silica and silicate,
the second additive being formed from at least one of those selected from a group consisting of a condensation product of an aromatic sulfonic acid with formaldehyde, a condensation product of an aromatic sulfonate with formaldehyde, polystyrene sulfonic acid, and polystyrene sulfonate;
a conductor layer formed on the carbon layer;
an anode terminal connected to the anode body; and
a cathode terminal connected to the conductor layer;
wherein the carbon layer contains the second additive, and a melting point of the second additive is at lowest 130° C. and at highest 215° C.

* * * * *